United States Patent [19]
Bettinger

[11] Patent Number: 6,166,361
[45] Date of Patent: Dec. 26, 2000

[54] ACTUATORS RELEASED BY REMOTE MICROWAVE RADIATION

[76] Inventor: David S. Bettinger, 830 Coventry, Grosse Ile, Mich. 48138

[21] Appl. No.: 09/016,963

[22] Filed: Feb. 2, 1998

[51] Int. Cl.[7] .................................................... H05B 6/70
[52] U.S. Cl. ............................................................ 219/697
[58] Field of Search ............................... 137/76; 335/4; 333/4, 104; 219/714; 330/106; 48/192; 411/20, 180; 74/2; 463/29, 20

[56] References Cited

U.S. PATENT DOCUMENTS

| | | | |
|---|---|---|---|
| 4,744,761 | 5/1988 | Doerfel et al. | 434/13 |
| 4,792,115 | 12/1988 | Jindra et al. | 251/149.6 |
| 5,467,067 | 11/1995 | Field et al. | 335/4 |
| 5,467,068 | 11/1995 | Field et al. | 335/4 |
| 5,606,889 | 3/1997 | Bielinski et al. | 74/2 |

*Primary Examiner*—Teresa Walberg
*Assistant Examiner*—Jeffrey Pwu

[57] ABSTRACT

Actuators that generate positional change and external force in response to remote microwave radiation. In a preferred embodiment the actuators remotely release an electrical connector by the heating of a friable metal element; and to the method of using microwave actuators for efficient disassembly of a manufactured hard goods entity.

14 Claims, 6 Drawing Sheets

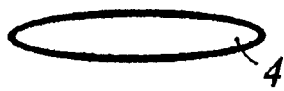
FIG. 3A.
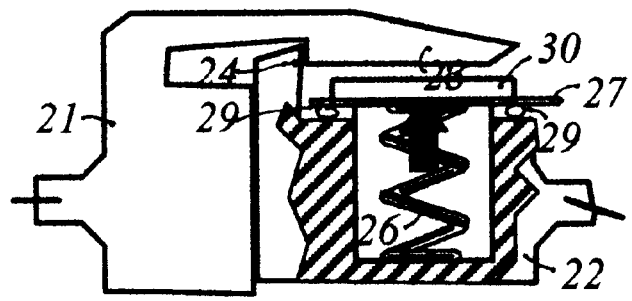
FIG. 3B.
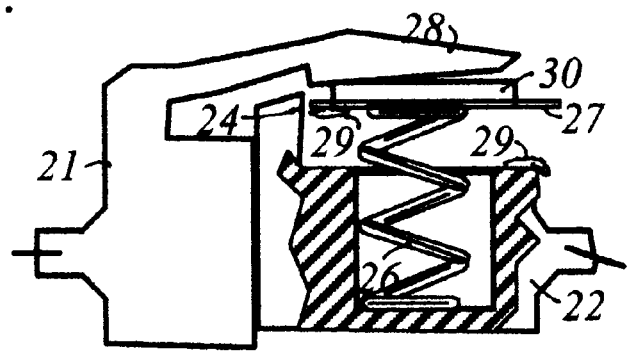
FIG. 3C.
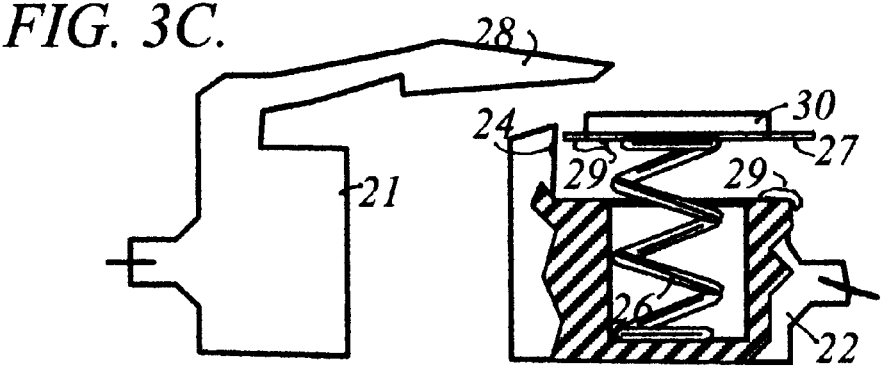

ACTUATORS RELEASED BY REMOTE MICROWAVE RADIATION

CROSS-REFERENCES TO RELATED APPLICATIONS

None

Statement as to Rights to Inventions made under Federally-sponsored Research and Development No Federally-sponsored work was involved.

BACKGROUND OF THE INVENTION

1. Field of the Invention

This present invention is directed to induction heating and more particularly to induction heated devices whereby the induction heating is produced in an actuator in response to remote microwave radiation so as to remotely release a joint, linkage, fastener, switch and connector by the heating of a friable metal foil, wire, tube, plate, and metal impregnated material; and to the method of using microwave for efficient disassembly of a manufactured hard goods entity.

2. Description of the Prior Art

In the prior art, microwave induction heating has been used for cooking and materials processing. In the prior art, remote release actuators have been disclosed that were activated by such means as mechanical, pneumatic, hydraulic, and electromotive. For all of these remote release actuators, a physical linkage and channel was required from the remote initiation point of command to the actuator. For example a solenoid actuator requires electric wires linking the command switch with the actuator.

In the prior art, disassembly of latched connectors required that the latch finger be forced to unlatch simultaneously with the separation of the connector components. In the prior art, hose clamps require manually loosening the clamp for removal. In the prior art, self tapping screws used to connect the plastic body shell of consumer electronics require the same number of turns to remove as to install.

In the prior art, recycling of mass produced automobiles, appliances, and computers presents a substantial cost burden due to the labor required for disassembly. For example, it may cost more to disassemble a hard goods product for recycling than to assemble it. Paul Bonenberger at General Motors has indicated that the hurdle in recycling of automotive components is the labor intensive disassembly of the connectors and fasteners themselves. It is not enough to standardize the type of fasteners since their location often changes from year to year, even for the same model from the same manufacturer. The ideal solution is to remotely release the restrain of multiple fasteners to allow removal without attention to individual pins, latches, clamps, nuts, and clasps. The direct application of heat for triggering fastener release has practical limitations since a hot liquid spill and an overheated component could prematurely trigger connectors designed for a release temperature below the melt temperature of most commercial plastics.

In the prior art of a microwave energy actuator, U.S. Pat. No. 5,467,067, Field, et.al., "Thermally actuated micro machined microwave switch," uses a microwave data stream to actuate a switching device. The device is distant to the source of the radiation but is the channel for the radiation; such a channel constituting a physical connection that is dimensionally distant but not separate and remote. Field et. al. releases no stressed member but rather uses the stress induced by the channeled energy to accomplish switching. No fastener and connector is employed in Field.

In the prior art of fusible actuators, U.S. Pat. No. 4,792,115, Jindra,et.al., "Coupling with fusible actuator member," a fluid valve is open and closed by a fusible link. The coupling itself in not released nor the connection broken by the device. Microwave is not employed.

SUMMARY OF THE INVENTION

1. Objects of the Invention

For the purposes of this invention, entity refers to a manufactured hard goods product such as an automobile, washing machine, computer, copier, and television. The terms connector and fastener are used interchangeably. For the purposes of this invention the term latch refers to the finger, pin, clip, clasp, clamp, ring, key, buckle, head, adhesive, bond and threads of the constraint mechanism that prevents positional movement between the components of a fastener and connector. The term release refers to the suspension and nullification of the latch constraint mechanism without necessarily separating the components of the fastener. Disengagement refers to the separation of the fastener components that can only take place after release of constraint that frees the fastener for separation. Disassembly refers to the process of release, disengagement, separation and removal from the entity.

An object of this invention is to provide remote actuation for release of a mechanism and device without the need for linkage between the power source and the actuator.

Another object of this invention is to provide the potential for the simultaneous actuation for disassembly of a multiplicity of connectors and fasteners within a manufactured hard goods product so as to simplify and reduce the cost of disassembly for recycling of components and materials.

Another general object of this invention is to provide a means for disassembly without the attention and effort required in the prior art to release and unlatch individual fasteners. The further objects of this invention are to provide a remote disassembly actuator for fasteners and connectors that will (1) exhibit structural integrity throughout the entity's service life, (2) possess limited potential for accidental activation, (3) manifest predictable damage to the entity parts themselves, and (4) provide a predictable potential for reuse and reconnection. Therefore another general object of this invention is to provide connectors and fasteners that may be used to manufacture products which are assured of a useful service life until decisively activated to release their grip thereby allowing separation of the components of the entity for efficient and economical disassembly.

It is a further object of this invention to provide disassembly devices and methods for both integral fasteners such as electrical wiring latch connectors and independent fasteners such as hose clamps.

FEATURES OF THE INVENTION

In keeping with these objects and others, which will become apparent hereinafter, one feature of this invention resides, briefly stated, in a remote fastener release actuator this is activated by a source of microwave radiation. It will be understood by one schooled in the art that microwave radiation of the intensity necessary to trigger these actuators is not likely to be experienced during the normal operating life of hard goods, nor without the effects of such intensity being observed and avoided, thus assuring fastener integrity during operational life. Examples of such unlikely and harmful intense sources would be an airport radar antenna and a microwave communications relay station both of which being, typically, secure installations.

It will be understood by one schooled in the art the correct positioning of these actuators, and precautions of shielding other friable elements will reduce the likelihood of damage to recyclables during the process of activation and disassembly.

It will be understood by one skilled in the art that beyond the generic embodiments of latch, pin, nut, head and clamp exhibited herein there are other mechanisms wherein this remote release actuator invention is directly claimed. These embodiments are meant to be representative rather than limiting on the breadth of applications possible within the family of actuators of this current invention which the claims disclose.

It will be understood by one schooled in the art that for the purposes of this invention, microwave radiation refers to that bandwidth of frequencies that is capable of creating heat in small metal objects at high intensities and short range.

It will be understood by one schooled in the art, that in the laboratory said friable metal element can be dimensioned and alloyed to release at a specified radiation level. It will be understood by one skilled in the art, that the cross-sectional area of the friable metal element may be dimensioned so as to facilitate the response of the actuator in the various embodiments of the invention.

It will be understood by one schooled in the art that said friable metal element may be a part of and restrain said stored energy reservoir and stressed elastic element in whole and in part.

It will be understood by one schooled in the art that some spacing is required to separate said friable metal element from large metal components of the entity to avoid the entity acting as a heat sink.

It will also be understood by one schooled in the art that each manufactured entity has attributes that will determine the spacing of the actuator within the fastener and the intensity of radiation required. For example the engine compartment of an automobile can contain and reflect microwave radiation with the steel hood closed that would not be possible with a polymer composite hood. It will be understood by one schooled in the art that the friable metal element of the actuator may be designed to respond and fail in a particular way that enhances the release function.

BRIEF DESCRIPTION OF THE DRAWINGS

FIG. 1.b. is a schematic of a microwave radiation source remote to a microwave actuator after the release of actuator.

FIG. 2.b. is a section through a button fastener restraining two panels that incorporates a microwave actuator after the release of actuator.

FIG. 3.a. is a section through an electrical latch connector that incorporates a microwave actuator before the release of actuator.

FIG. 3.b. is a section through an electrical latch connector that incorporates a microwave actuator during the release of actuator FIG. 3.c. is a section through an electrical latch connector that incorporates a microwave actuator after the release of actuator.

FIG. 4.b. is a section through a threaded nut fastener that incorporates a microwave actuator after the release of actuator.

FIG. 5.b. is a perspective view of a polymer composite connector for hoses that incorporates a microwave actuator after the release of actuator.

FIG. 6.b. is a section through a round headed fastener that incorporates a microwave actuator after the release of actuator.

DESCRIPTION OF THE PREFERRED EMBODIMENTS

In the following figures like elements are numbered in common. Also in the following figures arrows indicate the direction of stress induced upon the friable metal element in embodiments of this invention prior to complete actuation.

Figure 1A:
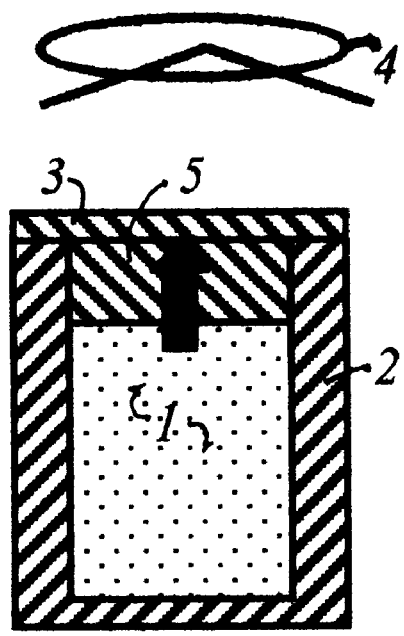
FIG. 1.a. is a schematic of a microwave radiation source remote to a microwave actuator before the release of actuator.
Figure 1B:
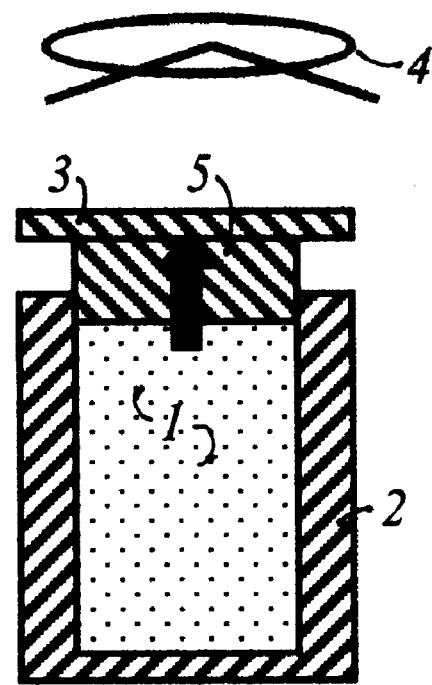

FIG. 1 illustrates an embodiment of the invention being simply stated a microwave actuator comprising a first member being a stored and potential energy source 1 contained in a second member being an energy pneumatic storage reservoir 2 possessing a friable metal closure 3 and which is stressed by and restrains said energy source 1, said stress being transmitted by piston 5 and indicated by the arrow, whereby in response to remote microwave radiation 4, heat is induced in said friable metal element 3 to release by direct and indirect means said stress and produce force and positional displacement external to said actuator by emerging movement of piston 5. In this embodiment of the actuator the addition of a piston member 5 intermediate between said energy source 1 and said friable metal element 3 assures sufficient positional actuator movement. FIG. 1 shows said energy source as pneumatic and said energy source may also be mechanical, elastic, and hydraulic.

Figure 2A:
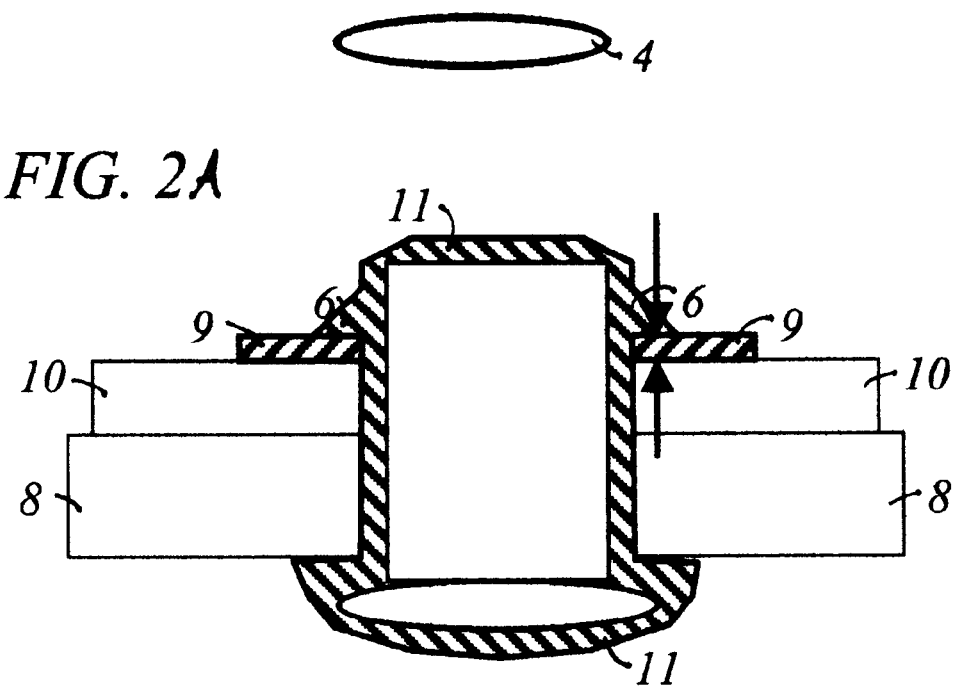
FIG. 2.a. is a section through a button fastener restraining two panels that incorporates a microwave actuator before the release of actuator.
Figure 2B:
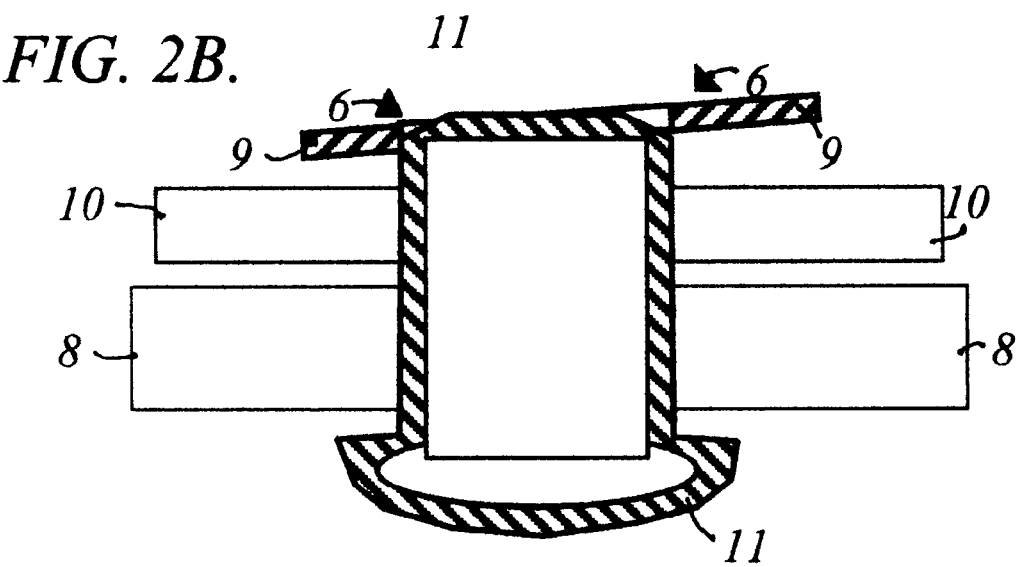

FIG. 2 depicts an embodiment of said actuator as a component of one member of a fastener 11, other embodiments being joint, connection, and switch, which is restrained from separation from other members by a retainer 6 such that in response to said microwave radiation 4 said actuator uncouples, unclasps and unhooks said retainer 6, freeing said members for ready disengagement and separation by other means.

In this embodiment of said actuator said fastener 11 is generally transparent to microwave radiation. Plates 8 and 10 are clamped by fastener 11 which has protruding retainer tangs 6 that are restrained by friable metal element represented as a segmental washer 9. Arrows indicate the compressive stress on the metal element 9 induced by the fastener tang 6 and the plate 10. Said friable metal element 9 when heated in response to said microwave radiation 4, conducts and transmits said heat to a second more friable element as a segmental washer 6 which deforms to release by said indirect means said stored energy source in this embodiment of a button fastener 11.

FIG. 3. represents a preferred embodiment in which two members 21 and 22 of an electrical connection are held together in nested position by a finger latch 23 in contact with surface 24. All components of the electrical connection are polymer and polymer composite except the functional conductive wiring (not shown) which is shielded. The arrow shows the direction of force stressing said friable metal element 27. Said friable metal element 27 is reinforced by the addition of a layer, plate, bar, wire, and beam that is generally transparent to microwave radiation 30. Said friable metal element 27 when heated in response to said microwave radiation 4, conducts and transmits said heat to a thermoplastic adhesive 29 which deforms when heated above the glass transition temperature of said adhesive 29 to release by said indirect means said stored energy source 26. The stored energy in the spring 26 reacts against energy storage reservoir 22 and the spring 26 forces the friable metal element 27 and said reinforcement 30 against the latch which attains a new position at 28. In this embodiment said friable metal element 27 may be constructed from wire, plate, bar, and foil diaphragm.

Figure 4A:
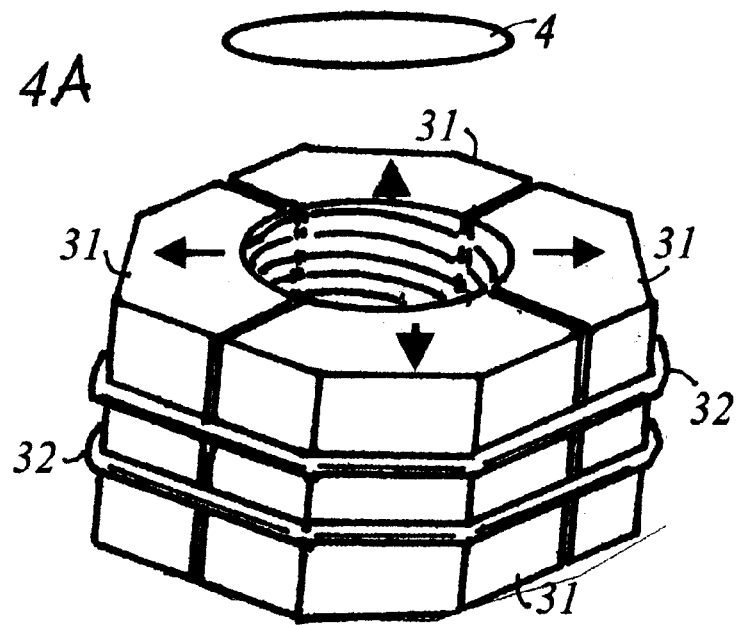
FIG. 4.a. is a section through a threaded nut fastener that incorporates a microwave actuator after the release of actuator.
Figure 4B:
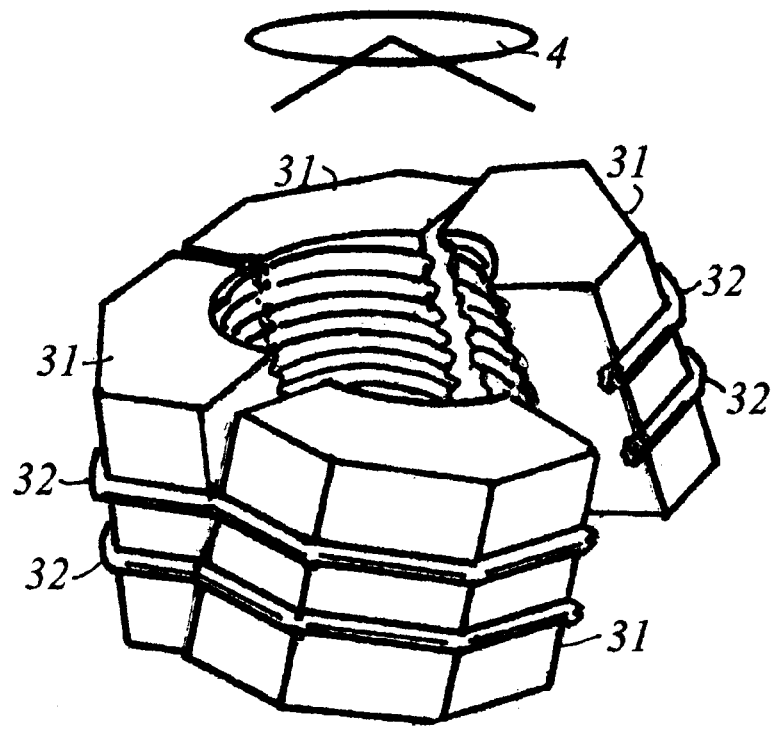

In FIG. 4, said friable metal element is shown as a wire 32 positioned to circumferentially restrain a segmented nut 31. The four arrows indicted the hoop tension placed on the friable metal element wire. In response to microwave radiation 4 of selected frequency and strength the wire 32 is burned through releasing the segments of the nut 31 for separation by other means.

Figure 5A:
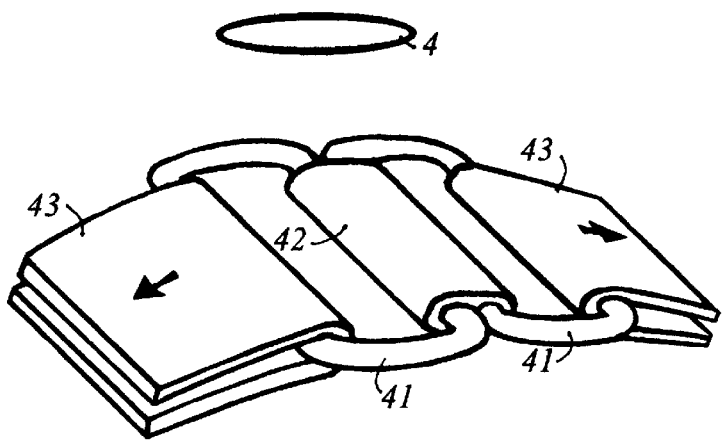
FIG. 5.a. is a perspective view of a polymer composite connector such as that used for hoses that incorporates a microwave actuator before the release of actuater.
Figure 5B:
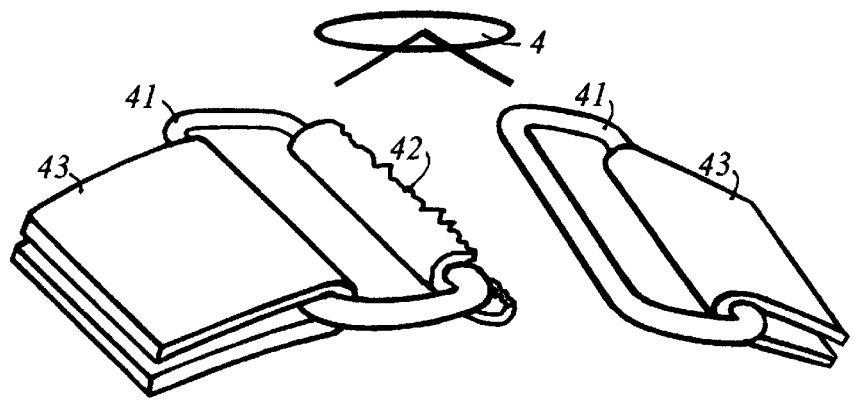

FIG. 5 depicts another embodiment of this actuator as a hose clamp whereby said energy source is a stressed friable polymer and polymer composite belt (circumferential clamp) 42 that stresses a wire friable metal element 41. In response to microwave radiation 4 of selected frequency and strength, the wire 41 is burned through, releasing the clamp. In an alternative embodiment a thermoplastic polymer strap 42 is heated and yields releasing hoops 41.

Figure 6A:
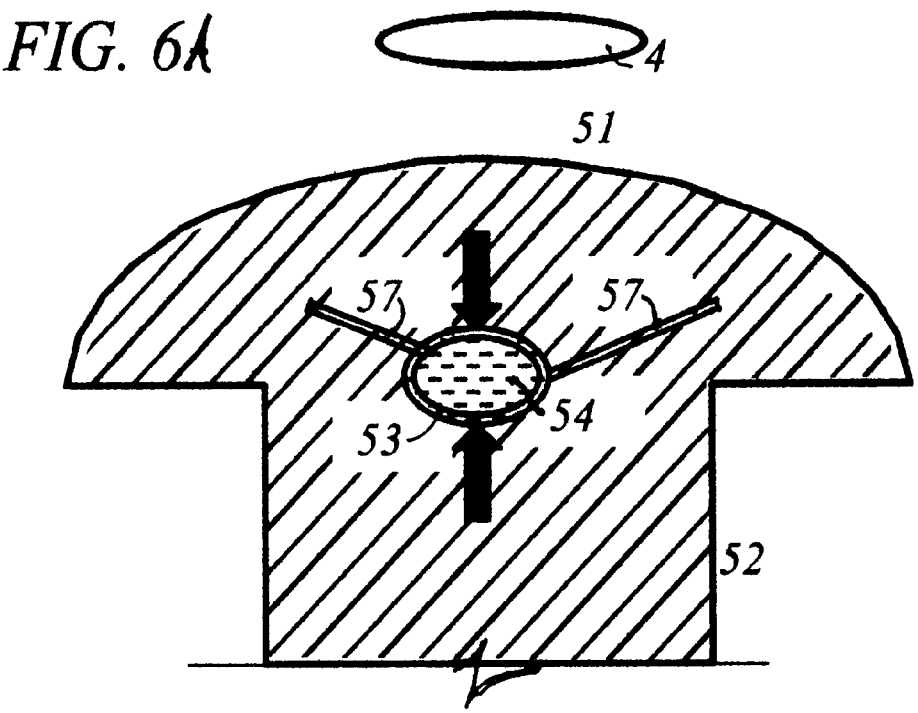
FIG. 6.a. is a section through a round headed fastener that incorporates a microwave actuator before the release of actuator.
Figure 6B:
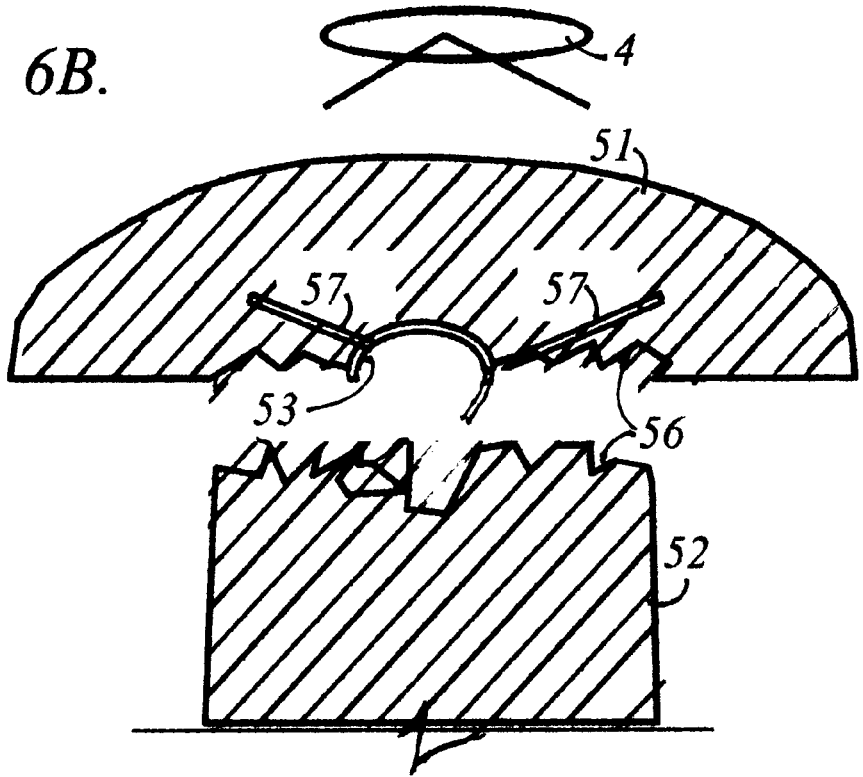

FIG. 6 illustrates another embodiment of the invention as a component actuator 53 of a round headed polymer and polymer composite fastener 51. The stored energy source is a boilable liquid energy accumulator 54, whereby in response to said microwave radiation 4, said friable metal element which constitutes the major portion of the energy storage reservoir 53, heats said liquid 54 by conduction, causing said liquid 54 to boil and expand, which said expansion acts to release by indirect means said stress and produce force and positional displacement external to said actuator 53. The expansion of the volume of the actuator 53 in response to microwave radiation 4 causes fractures along planes 55 and 56 and the subsequent separation of the round head 51 from the shaft of the fastener 52. In this and other embodiments said friable metal element 53 possesses at least one metal antenna 57 acting as an enhanced microwave radiant induction concentrator. The arrows indicate the compressive force that acts on the friable metal element 52 prior to the positional movement of the actuator.

The invention claimed is:

1. A microwave actuator comprising:
   an energy storage reservoir for storing a mechanical potential energy source;
   means disposed inside said reservoir for compressing said energy source;
   a friable metal enclosure connected to said means for compressing said energy source;
   wherein said enclosure, when heated in response to a remote microwave radiation, heat is induced in said friable metal to release said compressed energy source and produce a positional displacement external to said actuator.

2. The actuator of claim 1 wherein said energy source is pneumatic.

3. The microwave actuator of claim 2 wherein the stored energy source is a boilable liquid, energy accumulator, whereby in response to said microwave radiation, said friable metal closure heats said liquid by conduction, causing said liquid to boil and expand, which said expansion acts to release said stress and produce force and positional displacement external to said actuator.

4. The actuator of claim 1 wherein said metal closure is a wire, plate, bar, and foil diaphragm.

5. The microwave actuator of claim 1 wherein said microwave actuator is a component of one member of a joint, connection, and fastener which is restrained from separation from other members by a retainer such that in response to said microwave radiation, said microwave actuator uncouples, unclasps and unhooks said retainer, freeing said members for ready disengagement and separation.

6. The microwave actuator of claim 5 wherein said joint, connection, and fastener is generally transparent to microwave radiation.

7. The microwave actuator of claim 5 comprising the addition of a piston member intermediate between said energy source as a spring element and said friable metal closure.

8. The microwave actuator of claim 1 wherein said friable metal closure when heated in response to said microwave radiation, conducts and transmit said heat to a second more friable element which deforms to release said stored energy source.

9. The microwave actuator of claim 1 wherein said friable metal closure is positioned to restrain a latch 10. The microwave actuator of claim 1 wherein said friable metal closure when heated in response to said microwave radiation, conducts and transmits said heat to a thermoplastic adhesive which deforms when heated above the glass transition temperature of said adhesive to release said stored energy source.

11. The microwave actuator of claim 1 wherein said friable metal closure is reinforced by the addition of a material that is generally transparent to microwave radiation.

12. The microwave actuator of claim 1 wherein said friable metal closure is positioned to restrain a segmented nut.

13. The microwave actuator of claim 1 wherein said energy source is a stressed friable polymer and composite belt.

14. The microwave actuator of claim 1 wherein said friable metal closure possesses at least one metal antenna acting as an enhanced microwave radiant induction concentrator.

* * * * *